Figure 3:
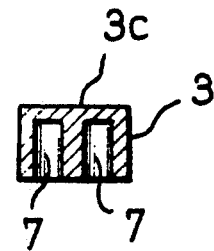

United States Patent [19]
Pitaud

[11] Patent Number: 5,283,395
[45] Date of Patent: Feb. 1, 1994

[54] WEIGHING APPARATUS WITH TEST BODY BEARING STRAIN GAUGES

[75] Inventor: Bernard Pitaud, Annecy, France

[73] Assignee: SEB S.A., Selongey, France

[21] Appl. No.: 901,235

[22] Filed: Jun. 19, 1992

[30] Foreign Application Priority Data

Jun. 19, 1991 [FR] France ............... 91 07520

[51] Int. Cl.[5] .................. G01G 3/08; G01G 3/14; G01L 1/22
[52] U.S. Cl. .................. 177/229; 73/862.27; 177/211
[58] Field of Search ............... 177/211, 229

[56] References Cited

U.S. PATENT DOCUMENTS

| | | | |
|---|---|---|---|
| 3,966,003 | 6/1976 | Miller | 177/211 |
| 4,338,825 | 7/1982 | Amlani et al. | 73/862.65 |
| 4,453,609 | 6/1984 | Griffen et al. | 177/211 |
| 4,886,133 | 12/1989 | Horn et al. | 177/211 |
| 5,072,799 | 12/1991 | Freeman et al. | 177/154 |
| 5,190,116 | 3/1993 | Reichow | 73/862.627 |

FOREIGN PATENT DOCUMENTS

| | | |
|---|---|---|
| 0050708 | 5/1982 | European Pat. Off. |
| 0052257 | 5/1984 | European Pat. Off. |
| 0296907 | 12/1988 | European Pat. Off. |
| 2341310 | 8/1974 | Fed. Rep. of Germany |
| 2655013 | 6/1978 | Fed. Rep. of Germany |

*Primary Examiner*—George H. Miller, Jr.
*Attorney, Agent, or Firm*—Young & Thompson

[57] ABSTRACT

The weighing apparatus comprises a base (1) and a receiving platform (2) for the load to be weighed, parallel to said base, a test body (3) extending between the base (1) and the platform (2), the opposite ends (3a, 3b) of which are fixed rigidly to the base (1) and to the platform (2) respectively, one (3c) of the faces of the test body (3) comprising strain gauges associated with an electric circuit.

The test body (3), molded in one single piece with the base (1) and the platform (2), is recessed.

Used in particular for making bathroom scales.

13 Claims, 2 Drawing Sheets

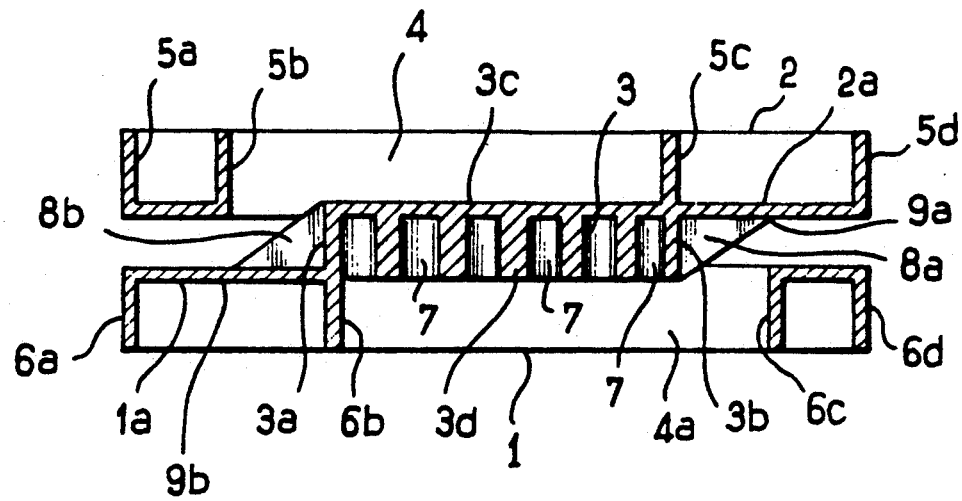
FIG_1
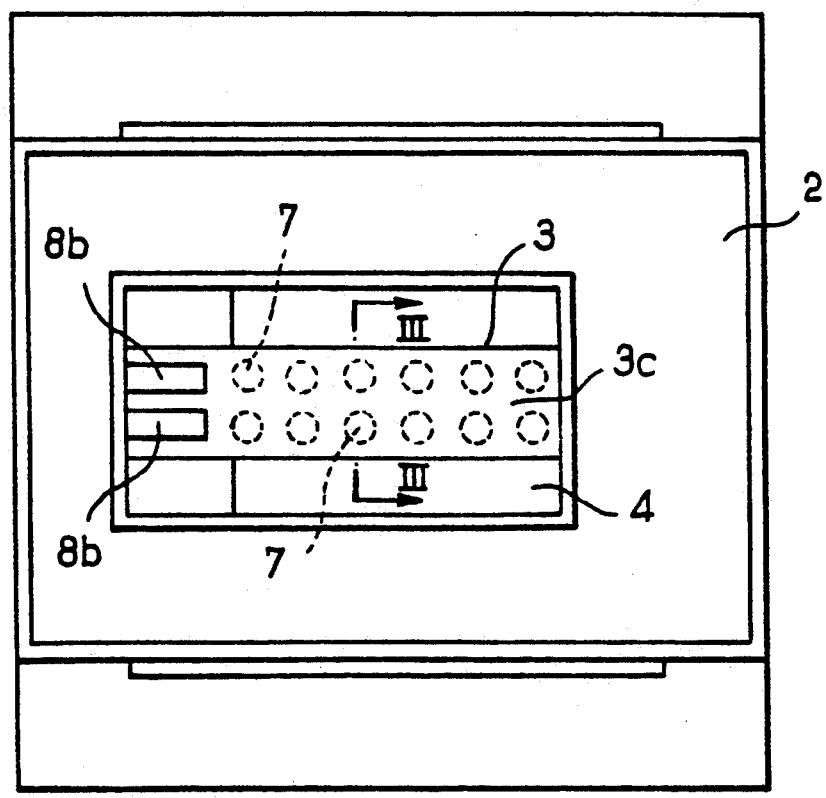
FIG_2

WEIGHING APPARATUS WITH TEST BODY BEARING STRAIN GAUGES

The present invention relates to a weighing apparatus, in particular for domestic use such as bathroom scales or food scales.

In particular from the French Patent No. 2 554 229 of the applicant, a weighing apparatus of the above type is known, which comprises a base and a receiving platform for the load to be weighed, parallel to said base, a test body extending between the base and the platform, the opposite ends of which are fixed rigidly to the base and to the platform respectively, one of the faces of the test body comprising strain gauges associated with an electric circuit, the test body being made of an elastic material so that it can bend under the effect of the load applied to the platform.

When the test body bends under the effect of the load to be weighed, the strain gauges work in extension, which modifies their ohmic value and generates at the output of the associated electric circuit an electric signal which is dependent upon the load.

In the embodiment described in the above French Patent, the test body is a bar made of steel which is fixed in a very precise and rigid manner to the platform and to the base.

The case with which fixing of the test body to the platform and to the base is carried out is decisive with regard to the precision and to the reliability of the weighing.

However, this constraint affects the cost of manufacture of the weighing apparatus.

The applicant has also described in its French Patent No. 2 616 224 a weighing apparatus, in which the assembly constituted by the platform, the test body and the base is made from a single piece by molding or duplicate molding.

However, the shrinkage of the material at the time of molding does not make it possible to bring it about that the face of the bar intended to receive the gauges is perfectly plane.

The aim of the present invention is to bring about improvements to the above known embodiments, creating a weighing apparatus which is inexpensive to manufacture and particularly suitable for mass production and making it possible to obtain a product having compact and perfectly reproducible dimensions, making it possible to reduce the costs of standardization linked to the deviations which exist between the different apparatuses, and having a bar face which is perfectly plane and smooth.

The invention thus relates to a weighing apparatus comprising a base and a receiving platform for the load to be weighed, parallel to said base, a test body extending between the base and the platform, the opposite ends of which are fixed rigidly to the base and to the platform respectively, one of the faces of the test body comprising strain gauges associated with an electric circuit, the test body being made of an elastic material so that it can bend under the effect of the load applied to the platform.

According to the invention, this apparatus is characterized in that the test body, molded in one single piece with the base and the platform, is recessed.

The fact that the above assembly is molded in one single piece makes it possible to simplify the mounting operations, to obtain apparatuses in which the test body is connected in a perfectly reproducible manner to the platform and to the base, which makes it possible to limit further checks.

The recessing of the bar makes it possible to lighten the bar and to facilitate molding of the latter. In particular, the recessing solves the problem of the shrinkage of the material at the time of molding and thus make it possible to bring it about that the face of the bar intended to receive the gauges is perfectly flat.

The assembly constituted by the platform, the test body and the base can thus be molded in aluminum or aluminum-based alloy, or in thermoplastic resin, or in ceramic.

These materials in fact have the elastic properties necessary for making a test body which is capable of working in flexion and in torsion, while making it possible to obtain, in the same molding operation, a platform and a base which are sufficiently rigid to be essentially undeformable under the effect of the load to be weighed.

Preferably, the test body is an elongate bar comprising a number of cells which open on the face opposite that bearing the strain gauges. The expert normally uses solid pieces but we have established that it is only necessary to take into account the characteristics of the material at the time of standardization.

According to an advantageous version of the invention, the platform and/or the base comprise an opening opposite the face of the test body bearing the strain gauges.

This opening for access to one of the faces of the test body makes it possible moreover to bring the test body very close to the platform and/or to the base, which makes it possible to obtain an apparatus having a very small height and therefore a very small space requirement.

According to a preferred version of the invention, the platform and the base are constituted by relatively thin molded plates which are rendered essentially undeformable by ribs.

These ribs which are molded at the time of the single molding operation of the assembly make it possible to obtain a platform and a base which are undeformable, with a small quantity of raw material.

Other details and advantages of the invention will emerge furthermore in the description below.

Figure 4:
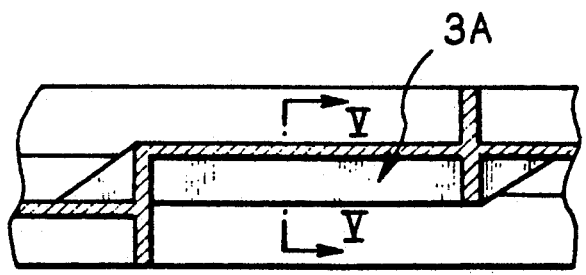
Figure 5:
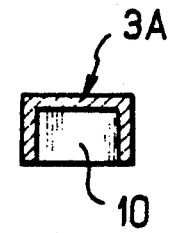
Figure 6:
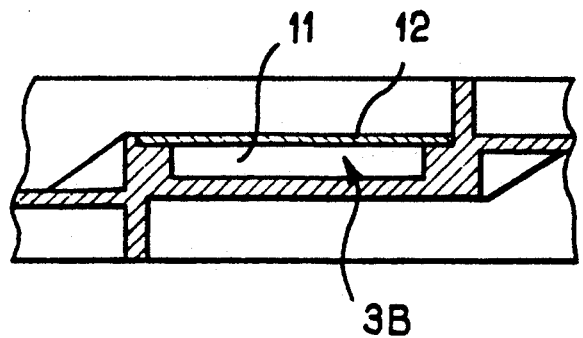

In the attached drawings which are given by way of non-limiting examples:

FIG. 1 is a view in longitudinal cross-section of bathroom scales according to the invention, FIG. 2 is a top plan view of the bathroom scales, FIG. 3 is a view in cross-section according to the plane III—III in FIG. 2, FIG. 4 is a partial view in longitudinal cross-section, showing a particular embodiment of the test body, FIG. 5 is a view in cross-section according to the plane V—V in FIG. 4, and FIG. 6 is a partial view in longitudinal cross-section showing another particular embodiment of the test body.

In the embodiment in FIGS. 1 and 2, the bathroom scale comprises a base 1, a receiving platform 2 for the load to be weighed parallel to said base 1 and a test body 3 extending between the base 1 and the platform 2.

The opposite ends 3a, 3b of the test body 3 are fixed rigidly to the base 1 and to the platform 2 respectively. The upper face of the test body 3 comprises strain gauges (not shown) associated with an electric circuit.

As far as the nature and the fixing of the gauges are concerned, as well as the characteristics of the associated electric circuit, reference is to be made to the description of the French Patent 2 554 229, the content of which is incorporated into the present description.

According to the present invention, the assembly constituted by the base 1, the platform 2 and the test body 3 is molded in one single piece, for example in thermoplastic resin, ceramic or any other material which is sufficiently elastic in order to be capable of bending slightly under the effect of the load applied to the platform 2.

In the embodiment shown, the platform 2 comprises an opening 4 opposite the face 3c of the test body 3 bearing the strain gauges.

This opening 4 makes it possible to access the face 3c of the test body 3 in order to put the gauges in position on the latter. This opening 4 also makes it possible to free the test body 3 from the platform in order to allow this test body to work in flexion.

It can also be seen in FIG. 1 that the platform 2 and the base 1 are constituted by relatively thin plates 2a, 1a which are rendered essentially undeformable by ribs 5a, 5b, 5c, 5d and 6a, 6b, 6c, 6d.

The ribs 5a, 5b, 5c, 5d of the platform 2 project upwards, while the ribs 6a, 6b, 6c, 6d of the base 1 project downwards. By virtue of these ribs, the base 1 and the platform 2 have the rigidity of thick solid plates, while being light.

As also indicated in FIG. 1, the test body 3 is an elongate bar extending in the middle of the base and the platform 2 and comprising a number of cells 7 which open on the face 3d opposite that bearing the strain gauges.

These cells 7 facilitate molding, and in particular they avoid the shrinkage of the material, which makes it possible to bring it about that the face 3c intended to receive the gauges remains perfectly plane and smooth.

It can furthermore be seen in FIG. 1 that the upper 3c and lower 3d faces of the test body 3 extend essentially in prolongation of the upper face 2a of the plate constituting the platform 2 and of the lower face 1a of the plate constituting the base 1 respectively.

This arrangement makes it possible to obtain a continuous connection between the platform 2, the test body 3 and the base. Moreover, it makes it possible to obtain an apparatus having minimal thickness.

FIG. 1 shows moreover that the platform 2 comprises a reinforcement rib 5c in line with one (3b) of the ends of the test body 3, while the base 1 comprises a reinforcement rib 6b in line with the other end 3a of the test body. These ribs reinforce the connection between the ends of the test body and the platform as well as the base, eliminating any possibility of flexion or other deformation in the zones of the base and of the platform adjacent to the test body.

Furthermore, the ends 3a and 3b of the test body 3 are connected respectively to the lower face of the platform 2 and to the upper face of the base 1 by ribs 8a, 8b extending in the direction of extension of the test body 3.

These ribs 8a, 8b have a triangular shape. The vertex 9 of these triangular ribs 8a, 8b which is furthest from the test body 3 is situated essentially in line with one 5b, 6c of the edges of the opening 4, 4a arranged in the platform 2 and in the base 1.

These triangular ribs 8a, 8b thus do not risk coming into abutment between the base 1 and the platform 2.

These ribs 8a, 8b also make it possible to rigidify the connection between the ends of the test body, the base and the platform.

In the embodiment in FIG. 4, the test body 3A is an elongate bar of essentially U-shaped transverse cross-section (see FIG. 5) open on the face opposite that bearing the strain gauges.

The recess 10 of the test body 3A serves the same function as the cells 7 of the test body 3.

In the case of the embodiment according to FIG. 6, the test body 3B is an elongate bar comprising a recess 11 extending over essentially the entire length of the bar. This recess 11 is closed by a plate 12 fixed to the bar. The plate 12 or the molded part 3B bears the strain gauges.

This plate 12 is fixed to the test body 3B by any appropriate means (screw, adhesive bonding, welding).

This plate or strip 12 forms, with the rest of the test body 3B, a parallelogram which is deformed at the time of the application of the load to the platform 2. This deformation modifies the ohmic values of the gauges, which generate by means of the associated electric circuit an electric signal which is dependent upon the load applied.

The invention is of course not limited to the exemplary embodiments which have just been described and numerous modifications can be applied to these without leaving the scope of the invention.

I claim:

1. A weighing apparatus comprising a base (1) and a receiving platform (2) for the load to be weighed parallel to said base, a test body (3) the opposite ends (3a, 3b) of which are integral with the base (1) and with the platform (2) respectively, one (3c) of the faces of the test body (3) being flat and comprising strain gauges associated with an electric circuit, the test body (3) being made of an elastic material so that it can bend under the effect of the load applied to the platform (2), wherein the test body (3), molded in one single piece with the base (1) and the platform (2), comprises at least one recess opening opposite the face (3c) bearing the strain gauges.

2. The apparatus as claimed in claim 1, wherein the test body (3) is an elongate bar comprising a number of cells (7) opening on the face (3d) opposite that bearing the strain gauges.

3. The apparatus as claimed in claim 1, wherein the test body (3A) is an elongate bar of essentially U-shaped transverse cross-section open on the face opposite that bearing the strain gauges.

4. The apparatus as claimed in claim 1, wherein the test body (3B) is an elongate bar comprising a recess (11) extending over essentially the entire length of the bar, this recess (11) being closed by a plate (12) fixed to the bar, the test body (3B) or the plate (12) bearing the strain gauges.

5. The apparatus as claimed in claim 1, wherein the abovementioned assembly is made of aluminum or aluminum-based alloy.

6. The apparatus as claimed in claim 1, wherein the assembly is molded in a thermoplastic resin or a ceramic.

7. The apparatus as claimed in claim 1, wherein the platform (2) and/or the base (1) comprise an opening (4, 4a) opposite the face of the test body (3) bearing the strain gauges.

8. The apparatus as claimed in claim 1, wherein the upper and lower faces (3c, 3d) of the test body (3) extend essentially in prolongation of the upper face of the face (2a) constituting the platform (2) and of the lower face of the plate (1a) constituting the base (1) respectively.

9. The apparatus as claimed in claim 1, wherein the platform (2) and the base (1) are constituted by relatively thin plates (2a, 1a) which are rendered essentially undeformable by ribs (5a-5d, 6a-6d).

10. The apparatus as claimed in claim 9, wherein the ribs (5a-5d) of the platform (2) project upwards, while the ribs (6a-6d) of the base (1) project downwards.

11. The apparatus as claimed in claim 9, wherein the platform (2) comprises a reinforcement rib (5c) in line with one (3b) of the ends of the test body (3), while the base (1) comprises a reinforcement rib (6b) in line with the other end (3a) of the test body (3).

12. The apparatus as claimed in claim 9, wherein the ends (3a, 3b) of the test body (3) are connected respectively to the lower face of the platform (2) and to the upper face of the base (1) by ribs (8a, 8b) extending in the direction of extension of the test body (3).

13. The apparatus as claimed in claim 12, wherein said ribs (8a, 8b) have a triangular shape, the vertex (9a, 9b) of which furthest from the test body (3) is situated essentially in line with one (5b, 6c) of the edges of the opening (4, 4a) arranged in the platform (2) and in the base (1).

* * * * *